Patented Apr. 6, 1926.

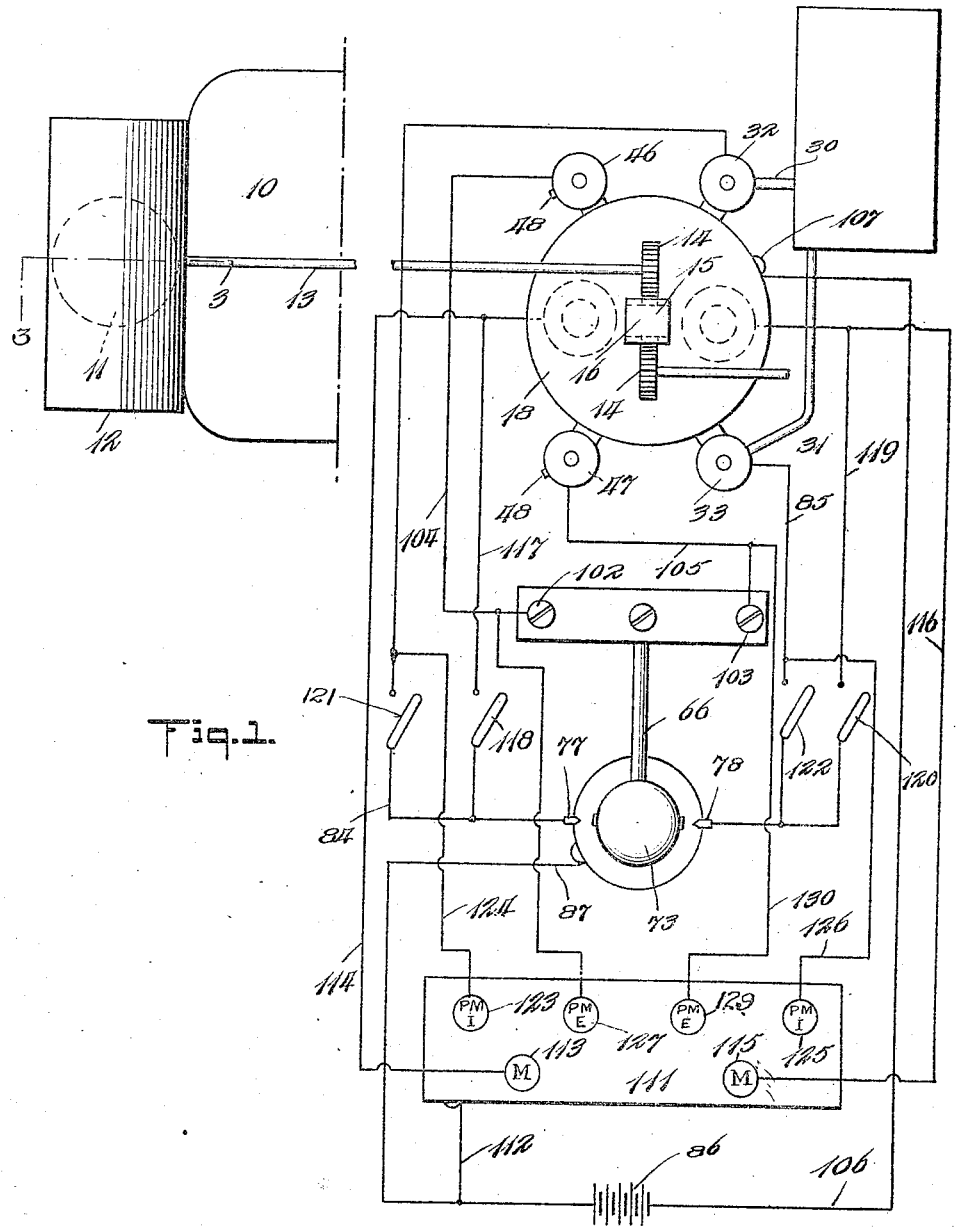

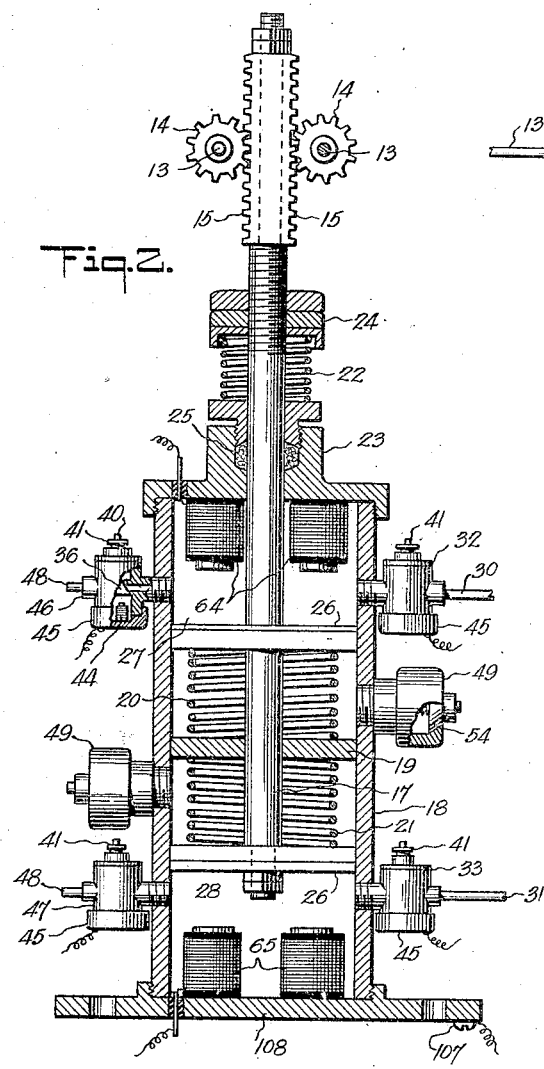
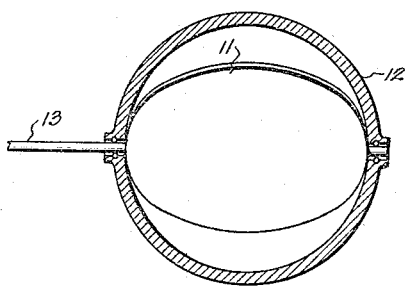
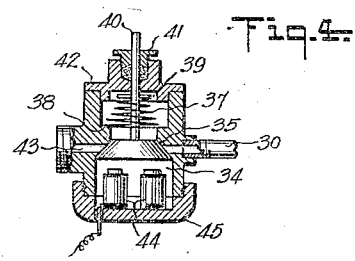
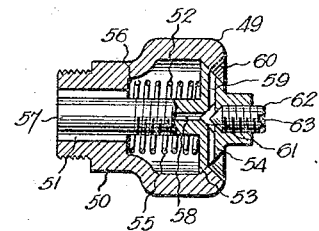

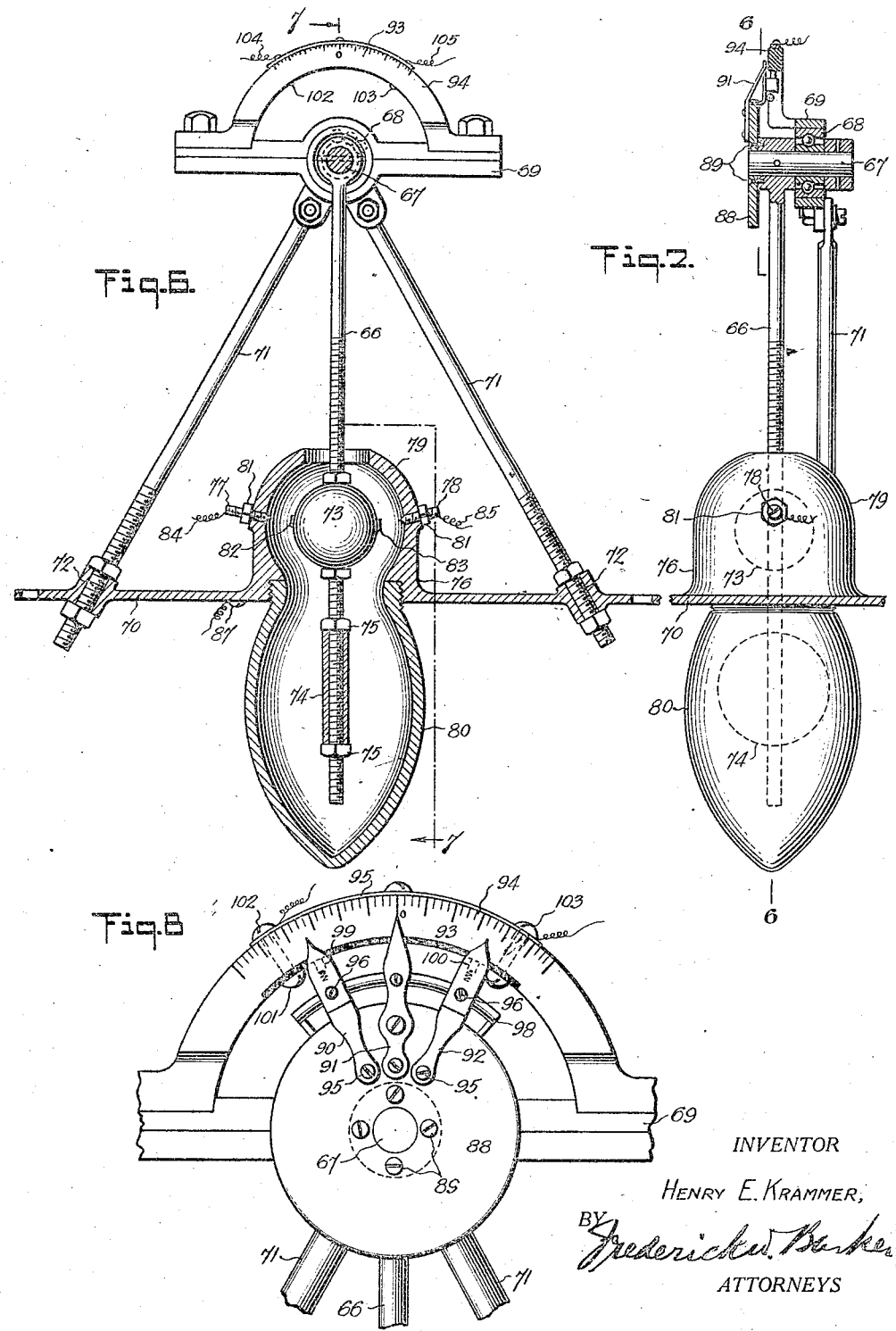

1,579,370

UNITED STATES PATENT OFFICE.

HENRY E. KRAMMER, OF NEW YORK, N. Y.

CONTROL MECHANISM FOR AEROPLANES.

Application filed February 16, 1924. Serial No. 693,159.

*To all whom it may concern:*

Be it known that I, HENRY E. KRAMMER, a citizen of the United States, residing at 1530 Brook Avenue, borough of Bronx, in the county of Bronx and State of New York, have invented a new and useful Improvement in Control Mechanism for Aeroplanes, of which the following is a specification.

My invention relates in general to a control mechanism of general application and particularly designed for maintaining stability and other aerodynamic control in aeroplanes. One of the objects of the invention is to provide a simple form of device of the character described which will be actuated either automatically through the tipping of the aeroplane into an abnormal position or which may be actuated selectively by a manual control.

In aeroplane structures now known, it is customary to control the machine through a set of instrumentalities, which, on becoming inoperative for any reason forces the operator to depend upon his manual control of the stabilizing and equilibrium mechanisms for governing the flight of the aeroplane.

Accordingly, one of the objects of this invention is to provide a safety feature to the control instrumentalities which will permit the utilization of a supplemental control when the primary control becomes ineffective. One means for attaining this result is to provide a plurality of actuating mechanisms so associated that in case any one set of the instrumentalities becomes ineffective, recourse is had to a supplemental set of instrumentalities for effecting either the automatic or manual control of the machine.

It has been found that the wing or aileron mechanism for effecting the control of the machines becomes ineffective under some conditions of service, such as are presented by cross currents which tend to resist the actuation of the mechanism.

Accordingly, another object of the invention is to provide a system or rather a combination of systems so corelated in their action on the aeroplane control mechanism that they may be caused to control the aeroplane by their collective action and thus bring into effect a strong powerful actuation of the control mechanism.

A further object of the invention is to provide a control mechanism which may be constructed in standard sizes for installation in any of the conventional types of aeroplanes and which will be so constructed and designed that the device may be readily adjusted and calibered to meet the requirements of the particular machine upon which they are designed to be mounted.

In one form of control mechanism now known, ailerons are provided to effect a stabilization of the machine, but these ailerons are frequently subjected to influences incidental to the flight of the machine which seriously affects their position and thus detracts from their stabilizing efficiency.

Accordingly, another object of the invention is to insulate these ailerons from local influences and incidental to this object it is further desired to provide a type of coupling between the ailerons actuating mechanism and the aerian, such that loose play is reduced to a minimum and a positive mechanical connection is provided so as to control any abnormal shifting of the vanes incidental to the flight of the machine.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a plan view of the aeroplane wing construction showing a preferred embodiment of my invention associated therewith and showing diagrammatically a wiring plan for use in connection with the control devices illustrated;

Figure 2 is a vertical sectional view taken through the control cylinder shown in plan in Figure 1;

Figure 3 is a transverse sectional view taken on the line 3—3 of Figure 1;

Figure 4 is a vertical sectional view taken through one of the fluid controlling inlet valves shown in Figure 2;

Figure 5 is a similar view of one of the fluid controlling exhaust valves shown in Figure 2;

Figure 6 is a vertical sectional view through the pendulum controlled compound circuit-closer constituting part of the system shown in Figure 1;

Figure 7 is a vertical sectional view of the circuit closer taken on the line 7—7 of Figure 6; and Figure 8 is a front elevational view of the upper portion of the circuit closer shown in Figure 7.

In the following description and in the claims, parts will be identified by specific names for convenience of expression but they are intended to be as generic in their application to similar parts as the art will permit.

In the accompanying drawings, there is shown a part of a conventional wing structure 10, at the outer tip of which is disposed a control vane 11, disposed in a protecting cylinder 12, which cylinder in this case is disposed to face in the direction of movement of the aeroplane when in flight.

While the control mechanism, hereinafter described, is designed to actuate any of the automatic control or stabilizing elements usually found in aeroplane construction and which are particularly designed to be controlled automatically by the tipping of the aeroplanes while in flight, the device illustrated will be described particularly with reference to the stabilizing device usually found in the extreme end of the wing construction for the purpose of controlling the movement of the aeroplane about its longitudinal axis. It is to be understood, therefore, that the construction shown in Figure 1, illustrates but one side of the complete control mechanism, the wing on the opposite side being similarly equipped with a housed vane. Said vanes are each mounted upon revolvable rods 13, the inner ends of which are fixed to pinions 14 and engage racks 15 positioned on opposite sides of a plunger rod 16 hereinafter more particularly described. It will be understood that the movement of the plunger rod 16 in one direction will cause one of the vanes to tilt in one direction and the corresponding vane at the opposite side of the aeroplane to tilt in the reverse direction. The movement of the rod into normal position will cause the vanes to assume a position approximately in the plane of the flight so as to offer their minimum resistance to the head-long flight of the machine. A corresponding movement of the plunger rod 16 in the opposite directions will cause a corresponding opposite tilting of the vanes so as to cause the machine to move in the direction opposite to the direction caused by the first described movement of the vanes. This functioning is common but in the device illustrated the vanes are positively connected to the actuating device through rigid mechanism which permit the least possible loose play in their actuation. Enclosing the vanes within the protecting cylinder permits the vanes to control the passage of the air current through the cylinders and at the same time prevents the vanes from being affected by any cross or local currents which might otherwise tend to shift the vanes automatically in some manner not controlled by the tipping action of the aeroplane.

The plunger rod 16 is rigidly fixed to a double headed plunger 17 slidably mounted to reciprocate within an air-tight cylinder 18 carried by the aeroplane and preferably positioned adjacent the center of gravity thereof.

The plunger is actuated by two control mechanisms, one pneumatically actuated and the other electromagnetically actuated. In order to maintain the plunger normally centered within the cylinder, the latter is formed within two compartments by means of a transverse partition 19. Disposed between the partition and each of the adjacent heads of the plunger is a pair of springs 20 and 21 acting thereon and normally holding the plunger in its neutral, centered position shown in Figure 2.

For the purpose of counteracting the lowering effect of the weight of the plunger and the parts connected thereto a spring 22 is positioned between the upper head 23 of the cylinder and a lock nut 24 in screw-threaded engagement with the rod 16 below the rack 15. The rod is caused to pass into the cylinder through a packing 25 in the head 23 which packing is designed to permit an easy movement of the plunger rod and at the same time prevent leakage through the head.

Each outer side of the plunger is provided with a soft metal face plate 26 designed to constitute the armatures of the electromagnetic system, hereinafter more fully described.

The portion of the cylinders between the faces 26 and the adjacent end of the cylinder constitute respectively an upper pressure chamber 27 and a lower pressure chamber 28. Each of these chambers is opened to a source of pneumatic pressure 29 respectively through piping system 30 and 31. Opening either one of the chambers to the charge of pneumatic pressure within the reservoir will cause the piston to move in the direction away from the side which contains the greater pressure. As the construction on each side of the partition 19 is similar a detail description of the portion of the cylinder at either side of the partition will be sufficient for the portion at the opposite side. The upper pressure chamber is provided with an inlet control valve 32 and the lower pressure chamber is provided with a corresponding valve 33 each positioned within the piping system leading to the respective chambers. These valves are preferably in the form of small cylinders threaded directly into the side of the cylinder. The valve as shown more particularly in Figure 4 includes a hollow casting 34 drilled vertically and horizontally and with the vertical drilling countersunk to provide a valve seat 35 upon which is normally seated a frusto-conical valve 36 maintained in its seated position by means of a spring 37. One end of the spring bears against a spring seat 38 formed in the casting and the other end bears against a transverse pin 39 extending through a valve stem 40 fixed to the valve 33. The stem extends through a packing box 41 carried in a cap 42 constituting a removable side of the valve casing 34. One side of the casing is opened through the valve seat to the piping system 30 or 31 and the opposite side is opened through the port 43 directly into the pressure space in the cylinder.

The valve is normally maintained in its seated position by means of the spring as described, and is designed to be moved into unseated position to permit the passage of the fluid therethrough, by means of a pair of small electromagnets 44 positioned within the casing 33 and held in place on a bottom closing cap 45. The electromagnets are so disposed relative to the wide face of the frusto-conical valve that the valve will act as an armature and be attracted towards the electromagnets, when the latter are energized, causing current to pass through the electromagnets to open the valve against the action of its closing spring. Each of the spaces 27 and 28 is also provided respectively with an exhaust valve 46 and 47 similar in construction to the inlet control valve hereinbefore described, except that the exhaust valves are provided with a port 48 designed to open the interior of the compression chambers to the outside air. This opening of the ports permits the reduction of pressure in the chamber opened so that the piston is free to return to its normal position.

The spring containing spaces on opposite sides of the portion 19 are designed to constitute air cushion chambers and are so arranged that on a movement of the cylinder heads away from the partition 19 air is admitted freely into the spaces but on a movement of the plunger heads towards the partition, the plunger is caused to act against an air cushion. This air cushion is caused to bleed slowly so as to permit a slow actuation of the device and thus prevent any abnormal, rapid or jerky movement of the control mechanism. For this purpose each of the spaces is provided with a double acting air valve 49 shown in detail in Figure 5. This air valve includes a cylinder casing 50, one open end of which is screwed into the side of the cylinder so as to open into the spring chamber controlled thereby. The casing is provided with a bore 51 extending axially therethrough and having a relatively large cross-section. The outer end of the bore is enlarged to form a spring chamber 52 and the outer of this bore is contracted to form an inwardly facing valve seat 53. A frusto-conical valve 54 is normally maintained in position on its seat by means of a spring 55, one end of which bears against the rear face of the valve and the opposite end of which bears upon a shoulder 56 formed by the enlargement of the fore. The air valve is provided with a stem 57 which extends rearwardly through the bore 51, towards the end thereof opening into the spring chamber. The valve is provided with a T-shaped passageway, one portion 58 of which extends axially through the stem 57 and the head portion 59 of which extends laterally across the length of the stem and is opened to the outside air through the cut-away portion 60 defining the outer end of the bore exteriorly of the valve seat. This passageway is of relatively small cross-sectional area so as to limit the bleeding capacity of the device and in order to regulate the extent of this bleeding the portion of the passageway at the junction of the stem portion 58 and the head portion 59 is countersunk to provide a seat 61 and the outer end of the valve is provided with a set screw 62. This set screw is provided with an externally accessible screw-driver slot 63 designed to be engaged by a tool to move the set screw to and from its seat 61 thus to regulate the outflow of air from the compression chamber through the passageway.

By this construction the overbalancing effect of external pressure due to the reduction of pressure within the spring chamber will permit the external air to act against the valve causing the same to move bodily off its seat and thus permit a rush of air into the spring chamber to fill the same. When pressure conditions within and to the outside of the valve approach their normal condition the spring will tend to seat the valve. The air in endeavoring to escape from the spring chamber will be resisted by the small bleeding capacity provided by the passageway 58 and any desired extent of bleeding may be provided by the proper manipulation of the set screw.

It is understood that in order to move the plunger 17 in either direction desired and thus effect a corresponding movement of the pair of control vanes pneumatic pressure is admitted onto either side of the cylinders to effect the desired movement. This may be done either by a manual type of circuit closer for controlling the circuits selectively through the electromagnets 44 or by a type of circuit closer actuated automatically by the tipping or other abnormal movement of the aeroplane.

Not only may the plunger in the device illustrated be actuated by the force of this pneumatic pressure but it may be actuated by an electromagnetically actuated mechanism. For this purpose each of the compression chambers is provided with a pair of electromagnets 64 for the upper chamber and 65 for the lower chamber. These electromagnets are designed when energized to act upon the adjacent soft metal faces 26 thereby to cause the electromagnets to draw on the plunger either independently of or coactively with the pressure means acting on the plunger.

It is obvious that the two energizing instrumentalities illustrated may be caused to work independently through the tipping of the aeroplane, may be caused to work under a strict manual control, either independently or coactively to effect the desired stabilizing effect on the control mechanism.

For the purpose of controlling the introduction of the actuating fluid automatically and selectively into either one of the compression chambers for the purpose of extending the pressure from the chambers or, when the electromagnet instrumentalities are in effective operation for the purpose of energizing the electromagnets 64 and 65 a control mechanism actuated automatically by the tipping of the aeroplane is associated with the fluid system and with the electromagnetic system so as to control either of these sources at will.

One such means is illustrated in Figure 6, in which the control of the several power sources is attained through the agency of a pair of circuit closers operatively connected to be actuated in the desired sequence through the swinging of a pendulum 66. The pendulum is mounted upon a fulcrum shaft 67 in turn mounted in ball bearings 68 carried by a frame 69 supported from and fixed to a plate 70. The frame includes a pair of diverging legs 71 fastened to the plate 70 through a turn-buckle arrangement 72. The plate may be mounted in any desired position approximating the horizontal by adjusting either or both legs longitudinally with reference to the plate and with reference to the other leg. The frame is adjusted so that the pendulum will hand normally in its vertical position hereinafter more particularly described. The pendulum is weighted by means of a heavy ball 73 in screw threaded engagement with the pendulum and arranged to be adjusted along the length of the pendulum thereby to vary the period of swing so as to meet the different conditions in which it is desired to operate the pendulum device. In order to dampen the processional swings of the pendulum a vane 74 is mounted to slide freely upon the lower end of the pendulum and is arranged to be held in adjusted position by stop nuts 75. The portion of the pendulum including the weight and vane is contained within an enclosing casing 76 designed to provide a fixed support to carry the electric contacts 77 and 78 and to enclose the weighted end of the pendulum so as to insulate the same from the influences of local drafts or other agencies which may tend to set up an abnormal or undesired swinging of the pendulum. The casing is formed in two parts, an upper dome part 79 formed integral with the plate 70 and a lower shell 80 in screw threaded engagement with the plate and lower portion of the dome part.

The pendulum is designed in either direction of its swing to close a circuit in one direction of swing through the contact 77 and in its movement in the other direction through the contact 78. The contacts are threaded to extend through the dome part 79 and are locked in their adjusted position by means of nut locks 81. The ball 73 is designed to constitute the coacting member of the circuit closers provided by the contacts 78 and 79 and in the device illustrated the ball is provided with embossment 82 and 83 designed to coact respectively with the contacts 77 and 78 to constitute the circuit closers for controlling the inlet valves. The contact 77 is connected to the electromagnet controlling the valve 32 by means of a conductor 84 and the contact 78 is similarly connected to the electromagnets controlling the valve 33 by means of a conductor 85. The bracket carrying the pendulum is connected to a source of electric energy 86 through a conductor 87.

For the purpose of controlling the circuit for energizing the electromagnet controlling the exhaust valves the pendulum is caused to actuate a second set of circuit closers. This second set includes a plate 88 fixed to the hub of the pendulum by means of screws 89 (see Figure 7). Three radially disposed indicators 90, 91 and 92 are positioned on the plate, extend beyond the edge thereof and are designed to move across a scale 93 carried on an arc plate 94 fixed to the top of the frame. This scale is graduated to provide a central normal position "0" and with graduations 95 extending in opposite direction from the zero mark. The middle indicator 91 is normally disposed in fixed position so as to point to the zero mark on the scale. The indicators 90 and 92 on opposite sides of the zero indicator have their inner ends pivoted to the plate by means of the screws 95$^a$ and have set screws 96 intermediate their lengths, which are designed to bind into an arc rod 98 carried by the plate. This arrangement permits the adjustment of the indicators 90 and 92 in set positions on the plate 88. The indicators 90 and 92 are made adjustable to have any desired relation to each other and to the zero indicator 91. The indicators 90 and 92 also constitute contact members for completing the circuit through the electromagnets controlling the exhaust valves 46 and 47 and for this purpose each of the indicators is provided upon its rear face with a spring pressed contact plunger 99 and 100 designed to move with the pendulum and to slide across an insulating plate 101, outlining the underside of the arc plate 93. A pair of contact buttons 102 and 103 are positioned to extend inwardly beyond the face of the insulated plate and positioned in the path of movement of their respective co-related contact plungers 99 and 100. The contact button 102 leads by means of a conductor 104 to the electromagnets controlling the exhaust 46, and a conductor 105 leads correspondingly from the contact button 103 to the electromagnets controlling the source of energy 86 to a button 107 on the plate 108 constituting the bottom of the cylinder 18. By this arrangement of wiring it is seen that cylinder 18, the arc plate 95 and the pendulum frame are each connected electrically with one side of the source of electric energy 86.

The invention as thus far described provides for an automatic actuation of the fluid inlet and outlet controlling valves and the electromagnet for drawing the plunger in either direction through the agency of the swinging pendulum mechanism.

It may happen that for some reason or other the swinging pendulum circuit closer may become inoperative, such as being destroyed by hostile rifle fire. In this case should the cylinder and the fluid pressure supply reservoir be intact the control mechanism can be controlled by a manually actuated type of circuit closer designed to actuate the electromagnet controlling the fluid pressure valves or at will to control the electromagnets either selectively or collectively.

For this purpose a switch board 111 is positioned convenient to the operator and is provided with a plurality of push button types of circuit closers for closing the circuit through the several sets of electromagnets. One side of the switch board is connected to the source of energy 86 through a conductor 112, it being understood that the circuit is completed through any one of the push buttons on the switch board and through conductors which lead from the push button through the several sets of electromagnets. The switch board is provided with a push button 113 which is connected electrically to the electromagnet 65 through a conductor 114 and a corresponding push button 115 is connected to the electromagnet 64 through a conductor 116. The conductor 114 is also connected to the contact 77 through the conductor 117 which contains a manually actuated control switch 118 within its length. Similarly the conductor 116 is connected to the contact 78 by means of a conductor 119 which contains a manually actuated switch 120 within its length. The conductor 84 is provided with a control switch 121 and the conductor 85 is similarly provided with a control switch 122.

The switch board is provided with a push button 123 for closing the circuit through the inlet magnet 32 and for this purpose a conductor 124 leads from the push button 123 to the portion of the conductor 84 beyond the switch 121. A similar push button 125, carried by the switch board, is connected to the electromagnet controlling the inlet valve 33 and for this purpose a conductor 126 leads from the push button 125 and is connected to the conductor 85 at a point beyond the switch 122. The switch board is provided with a push button 127 connected to the conductor 104 for controlling the electromagnets actuating the exhaust valve 46 and the switch board is also provided with a push button 129 connected by means of a conductor 130 to the conductor 105 for the purpose of closing the circuit through the electro-magnet controlling the exhaust valve 47.

In operation, and assuming that the several switches 121, 118, 122 and 120 are in the open position shown, then any of the electromagnets controlling either the fluid inlet to the cylinders or the exhaust therefrom may be actuated merely by pressing the proper push button on the switch board. For instance, should it be desired to actuate either one of the inlet valves the push button 123 or 125 would be actuated and correspondingly to exhaust the compression chamber of the fluid therein, push buttons 127 or 129 would be actuated. Should it be desired to draw the plunger through the agency of the electromagnetic means then either the push button 113 or 115 would be depressed as desired.

Should it be desired to actuate the several electromagnets through the tipping action of the aeroplane, then either or both of the sets of switches are moved into their closed position.

Let it be assumed that the switches 118 and 120 are moved into closed position. In this case the swinging of the pendulum to the right will complete the circuit through the contact 78, conductor 119 to energize the electromagnet 65 and correspondingly the swinging of the pendulum to the opposite direction to complete the circuit through the contact 77, conductor 117 to actuate the electromagnet 64. Should the set of electromagnets 121 and 122 be closed then the swinging of the pendulum to the right will complete the circuit through the contact 78 through the conductor 85 to energize the electromagnets controlling the inlet 33. Similarly a swinging of the pendulum to the left will close the circuit through the contact 77, conductor 84 to actuate the pneumatic controlling the valve 32.

Simultaneously with this swinging of the pendulum to the right the circuit will be completed through the contact 102 through the conductor 104 to actuate the electromagnet controlling the exhaust valve 46 or the swinging of the pendulum in the opposite direction will close the circuit through the contact 103, conductor 105 to actuate the electromagnets controlling the exhaust valve 47.

Should both sets of switches be moved into closed position, then it will be obvious that the movement of the pendulum in one direction will act not only to open the inlet valve for moving the plunger in one direction but this movement of the pendulum will also act to energize the electromagnet on the opposite side of the plunger so that the plunger is simultaneously acted upon by the source of the pneumatic pressure acting on one side thereof and the drawing effect of the electromagnet acting on the opposite end thereof.

By means of a device of this character it is possible to control not only the aileron stabilizing device, herein disclosed, but any control mechanism at present utilized in aeroplanes for affecting the aerodynamic conditions of the same, so that the device illustrated may not only be applicable to stabilizing but may also be applicable to automatic guiding or lifting or tilting mechanisms.

The device disclosed may be formed of standard parts and the adjustment features disclosed permit the device to be set to act at any angle of tipping of the device and may obviously be controlled not only by the operator present in the machine, but may be adopted to any of the wireless control devices now known.

The safety feature of the device is of prime importance. In this device disclosed there is provided not only a simple form of manual control actuated at the will of the operator but two sets of automatically actuated instrumentalities are combined within a simple unitary organization of parts. It will be usual for the operator to depend primarily upon the pneumatic system illustrated and the electromagnetic system will be utilized only in case of emergency either through the loss of pneumatic power in those cases where a quick actuation of the device is desired and the pneumatic power should prove ineffective for causing the quick actuation of the controlling device.

It is obvious that the installation of a device such as is disclosed will provide a direct and positive transmission of power between the actuating mechanism and the aeroplane control mechanism without the necessity of struts, guy ropes and other usual transmission and bracing devices which might offer resistance to the drift of the aeroplane and introduce chattering of the same with the resulting breaking down of structural parts.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Variations within the spirit and scope of my invention are comprehended by the foregoing disclosure.

I claim:

1. In an aeroplane, a control vane, an actuating device including a fluid tight casing, a plunger mounted to reciprocate in said casing and operatively connected to said vane to actuate the same, and separate means actuable both selectively and jointly for moving said plunger in said casing, one of said means comprising pneumatic mechanism and the other comprising electromagnets.

2. In an aeroplane, a control vane, an actuating device including a fluid tight casing, a plunger mounted to reciprocate in said casing and operatively connected to said vane to actuate the same, separate means actuable both selectively and jointly for moving said plunger in said casing, one of said means comprising pneumatic mechanism and the other comprising electromagnets, and electrical means for bringing said plunger moving means into operation.

3. In an aeroplane, the combination of an aeroplane control device, a plunger for operating said device and separate mechanisms for actuating said plunger, one of said mechanisms being pneumatic and the other electromagnetic, and electrical means for controlling both said pneumatic and electromagnetic actuating mechanisms.

4. In an aeroplane, the combination of an aeroplane control device, a plunger for operating said device and separate mechanisms for actuating said plunger, one of said mechanisms being pneumatic and the other electromagnetic, and electrical means for controlling both said pneumatic and electromagnetic actuating mechanisms, and manually controlled means for selectively causing one of the mechanisms to become operative and the other to become inoperative.

5. In an aeroplane, a control device for the aeroplane, said device including a cylinder, a plunger slidably mounted therein, separate plunger actuating means, each adapted for independent operation, and electrical means controlled by the tipping of the aeroplane for inaugurating the action of either of said plunger actuating means.

6. In an aeroplane, a control device for the aeroplane, said device including a cylinder, a plunger slidably mounted therein, separate plunger actuating means, each adapted for independent operation, electrical means controlled by the tipping of the aeroplane for inaugurating the action of either of said plunger actuating means and manually controlled means for selectively coupling either of said plunger actuating means to said tipping controlled means.

7. A mechanical control device for aeroplanes, comprising a casing, a plunger slidably mounted in said casing, a device controlling member projecting from the plunger out through one end of the casing, a soft iron face defining opposite ends of said plunger, electro-magnets positioned in the casing on opposite sides of the plunger and facing the soft iron faces to attract the same when the electro-magnets are energized, and means for selectively energizing opposite sets of electro-magnets.

8. A mechanical control device for aeroplanes, comprising a casing, a plunger slidably mounted in said casing, a device controlling member projecting from the plunger out through one end of the casing, a soft iron face defining opposite ends of said plunger, electro-magnets positioned in the casing on opposite sides of the plunger and facing the soft iron faces to attract the same when the electro-magnets are energized, means for selectively energizing opposite sets of electro-magnets and a source of pneumatic power opened to the space within the casing and at one side of the plunger, whereby the plunger may be moved either by pneumatic or electro-magnetic power.

9. A mechanical control device for aeroplanes, comprising a casing, a plunger slidably mounted in said casing, a device controlling member projecting from the plunger out through one end of the casing, a soft iron face defining opposite ends of said plunger, electro-magnets positioned in the casing on opposite sides of the plunger and facing the soft iron faces to attract the same when the electro-magnets are energized, means for selectively energizing opposite sets of electro-magnets and means acting on said plunger for returning the same to its normal position when free of the electro-magnetic tension created by the energized electro-magnets.

10. In an aeroplane, a wing construction, a pivoted control vane carried by the wing, a rod mounted for rotary movement about its longitudinal axis and fixed to the vane to rock the same in said rotary movement, a pneumatically actuated mechanism including a cylinder, a plunger slidably mounted in the cylinder, a plunger stem fixed to the plunger, a rack upon said stem, a pinion carried by said rod in mesh with said rack, and pneumatic means connected to the cylinder to actuate its plunger.

11. An aeroplane provided with laterally extending wings, and control vanes positioned on the wings, of a pair of control mechanisms for actuating the vanes mechanically and simultaneously, each of said mechanisms being actuated automatically by the tilting action of the aeroplane and electrical means for controlling each of said mechanisms.

12. In an aeroplane, the combination with a stabilizing device, of a protecting means enclosing said stabilizing device on all sides except the sides in line with the line of flight of the machine, said protecting means being open at front and rear to permit the movement of air currents in one direction past said stabilizing device, a pair of opposing springs positioned exteriorly of said protecting means and acting on said stabilizing device for returning the same to its normal position, and automatically actuated means acting on said stabilizing device for moving the same at will in either direction from its normal position and against the action of said springs.

13. In an aeroplane, the combination of a stabilizing device, an armature operatively connected to said device, means for actuating said armature pneumatically, an electromagnet associated with said armature to move the same in one direction, resilient means for restoring the armature in normal position and means controlled by the tipping of the aeroplane for energizing said electromagnet.

14. In an aeroplane, the combination of a stabilizing device, an armature operatively connected to said device, an electro-magnet associated with said armature to move the same in one direction from its normal position, means controlled by the tipping of the aeroplane for energizing said electro-magnet and a manually controlled switch in circuit with said electro-magnet for energizing the same in addition to the automatic control for energizing the electro-magnet provided by said means and balanced springs acting on said armature for returning the same to a normal position when free of the controlling action of said electro-magnet.

15. In an aeroplane, the combination of an actuating cylinder, an electrically actuated valve for admitting an actuating fluid to said cylinder, an electrically actuated valve for exhausting the actuating fluid from said cylinder, a pendulum controlled by the tilting of the aeroplane, a pair of normally open circuit closers, one adapted to close the circuit through the fluid-admitting valve and the other adapted to close the circuit through the fluid-exhausting valve, the movable element of each of said circuit closers being operatively connected to said pendulum so as to be moved thereby into circuit closing position.

16. In an aeroplane, the combination of an actuating cylinder, an electrically actuated valve for admitting an actuating fluid to said cylinder, an electrically actuated valve for exhausting the actuating fluid from said cylinder, a pendulum controlled by the tilting of the aeroplane, a pair of normally open circuit closers, one adapted to close the circuit through the fluid-admitting valve and the other adapted to close the circuit through the fluid-exhausting valve, the movable element of each of said circuit closers being operatively connected to said pendulum so as to be moved thereby into circuit closing position, one of said circuit closers provided with means for varying its circuit closing position relative to the circuit closing position of the other circuit closer.

17. In an aeroplane, a control device including an armature, an electro-magnet for acting on said armature, pneumatic means for acting on said armature and including an electrically controlled valve, a pendulum, a circuit including said electro-magnet and a pair of contacts, one carried by the pendulum and a corelated contact disposed in the path of movement of the contact carried by the pendulum, a second circuit including said electrically controlled valve, a contact controlled by the movement of the pendulum and a corelated contact disposed in the path of movement of said last named contact, said contacts constituting circuit closers disposed relative to each other whereby a movement of the pendulum in one direction will actuate both circuit closers and thus actuate both the electromagnet and the electrically controlled valve.

18. In an aeroplane, a control device including a pendulum, a circuit closer including a pair of contacts, one carried by the pendulum and a corelated contact disposed in the path of movement of the contact carried by the pendulum, an electrically controlled inlet valve in circuit with said circuit closer, a second circuit closer including a contact controlled by the movement of the pendulum, a corelated contact disposed in the path of movement of said last named contact, an electromagnet in circuit with said second circuit closer, said circuit closers being disposed relative to each other whereby a movement of the pendulum in one direction will actuate both circuit closers, a third circuit closer actuated by the swing of the pendulum in its movement in the direction opposite to the direction for actuating the first named pair of conduits and an electrically controlled outlet valve in circuit with said third circuit closer.

19. In an aeroplane, the combination with an electrically actuated aeroplane control including a pair of electrically actuated mechanisms, of a pair of circuit closers for controlling said mechanisms automatically through the tilting of the machine in opposite directions, said circuit closers including a single pendulum, a pair of electric conductors with one end of their circuits grounded and adapted to be controlled by the tipping of the aeroplane, a pair of contacts insulated from said grounded pendulum and disposed in the path of swing of the pendulum as it swings in opposite directions from its normal position whereby the movement of the pendulum into engagement with either of said contacts will complete the circuit to one of said mechanisms, said contacts being adjustable relative to the pendulum and relative to each other thereby to vary the degree of angle of tilt of the aeroplane at which the control mechanisms become operative.

20. In an aeroplane, the combination with an electrically actuated aeroplane control mechanism, of a circuit closer for controlling said mechanism automatically through the tilting of the machine, said circuit closer including a pendulum, an electric conductor with one end of its circuit grounded and adapted to be controlled by the tiping of the aeroplane, a contact insulated from said grounded pendulum and disposed in the path of swing of the pendulum, whereby the movement of the pendulum into engagement with said contact will complete the circuit to said mechanism, a housing for the lower end of the pendulum and a vane adjustably mounted on the lower end of the pendulum and constituting a variable mechanism for dampening the free swing of the pendulum.

21. In an aeroplane, the combination with an electrically actuated aeroplane control mechanism, of a circuit closer for controlling said mechanism automatically through the tilting of the machine, said circuit closer including a pendulum, an electric conductor with one end of its circuit grounded and adapted to be controlled by the tipping of the aeroplane, a contact insulated from said grounded pendulum and disposed in the path of swing of the pendulum, whereby the movement of the pendulum into engagement with said contact will complete the circuit to said mechanism, and mechanism for dampening the free swing of the pendulum, said mechanism being mounted on the pendulum and including means for adjusting its position on the pendulum.

22. In an aeroplane, the combination with an electrically actuated aeroplane control mechanism of a circuit closer for controlling said mechanism automatically through the tilting of the machine, said circuit closer including a pendulum, a pair of coacting contacts, one mounted in relatively fixed position and the other carried by the pendulum, said contacts being relatively adjustable thereby to vary the extent of movement of the pendulum necessary to effect a circuit closing engagement of the contacts and means for adjusting the center of gravity of said pendulum.

23. In an aeroplane, the combination with an electrically actuated aeroplane control mechanism, of a circuit closer for controlling said mechanism automatically through the tilting of the machine, said circuit closer including a pendulum, provided with a weight adjustably mounted thereon, a two-part fixed casing for enclosing the weighted end of the pendulum, a contact carried by the casing, said pendulum constituting a co-acting contact when swung into engagement with the contact carried by the casing, the parts of said casing being readily separable thereby to provide access to the weight on the pendulum to adjust the same.

24. In an aeroplane, the combination with an electrically actuated aeroplane control mechanism, of a circuit closer for controlling said mechanism automatically through the tilting of the machine, said circuit closer including a pendulum, provided with a weight, a casing for enclosing the weighted end of the pendulum, and a vane carried by the pendulum within the casing disposed across the line of movement of the pendulum and constituting a means for dampening the swing of the pendulum.

25. In an aeroplane, the combination with an electrically actuated aeroplane control mechanism, of a circuit closer for controlling said mechanism automatically through the tilting of the machine, said circuit closer including a pendulum, provided with a weight, a casing for enclosing the weighted end of the pendulum, and a vane carried by the pendulum within the casing disposed across the line of movement of the pendulum and constituting a means for dampening the swing of the pendulum, said vane being adjustable along the length of the pendulum.

26. In an aeroplane, the combination of a control mechanism, a cylinder provided with a fixed partition for dividing the same into two plunger compartments, a plunger mounted in each compartment, said plungers being operatively connected to said control mechanism to actuate the same, means on opposite sides of the partition for moving its adjacent plunger and mechanism controlled by the tipping of the aeroplane for controlling said means.

27. In an aeroplane, the combination of a control mechanism, a cylinder provided with a fixed partition for dividing the same into two plunger compartments, a plunger mounted in each compartment, said plungers being operatively connected to said control mechanism to actuate the same, means on opposite sides of the partition for moving its adjacent plunger and mechanism controlled by the tipping of the aeroplane for controlling said means and means positioned in the space between the partition and the plungers for maintaining the plungers in normal position.

28. In an aeroplane, the combination of a control mechanism, a cylinder provided with a fixed partition for dividing the same into two plunger compartments, a plunger mounted in each compartment, said plungers being operatively connected to said control mechanism to actuate the same, means on opposite sides of the partition for moving its adjacent plunger and mechanism controlled by the tipping of the aeroplane for controlling said means, and means positioned in the space between the partition and the plungers for tending to maintain an external atmosphere condition in said space.

Executed this 14th day of February, 1924.

HENRY E. KRAMMER.